(12) United States Patent
Sigle

(10) Patent No.: US 10,506,141 B2
(45) Date of Patent: Dec. 10, 2019

(54) VEHICLE CAMERA WITH CAST RESIN SEALING

(71) Applicant: MAGNA ELECTRONICS INC., Auburn Hills, MI (US)

(72) Inventor: Marc-Andre Sigle, Alzenau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/983,213

(22) Filed: May 18, 2018

(65) Prior Publication Data

US 2018/0338070 A1 Nov. 22, 2018

Related U.S. Application Data

(60) Provisional application No. 62/508,574, filed on May 19, 2017.

(51) Int. Cl.
*H04N 5/225* (2006.01)
*G06K 9/00* (2006.01)
*G06K 9/20* (2006.01)

(52) U.S. Cl.
CPC ......... *H04N 5/2252* (2013.01); *H04N 5/2253* (2013.01); *H04N 5/2254* (2013.01); *H04N 5/2257* (2013.01); *H04N 5/22521* (2018.08); *G06K 9/00805* (2013.01); *G06K 9/209* (2013.01)

(58) Field of Classification Search
CPC ............. H04N 5/2252; H04N 5/22521; H04N 5/2257; H04N 5/2253; H04N 5/2254; G06K 9/209; G06K 9/00805
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,965,336 B2 | 6/2011 | Bingle et al. |
| 8,542,451 B2 | 9/2013 | Lu et al. |
| 9,233,641 B2 | 1/2016 | Sesti et al. |
| 9,277,104 B2 | 3/2016 | Sesti et al. |
| 9,451,138 B2 | 9/2016 | Winden et al. |
| 10,142,532 B2 | 11/2018 | Mleczko |
| 2006/0061008 A1 | 3/2006 | Kamer et al. |
| 2006/0110599 A1 | 5/2006 | Honma et al. |

(Continued)

*Primary Examiner* — Padma Haliyur

(74) *Attorney, Agent, or Firm* — Honigman LLP

(57) ABSTRACT

A camera for a vehicular vision system includes a camera housing, a PCB having circuitry disposed thereat, and a lens assembly. The circuitry includes an imager disposed at one side of the PCB, and the circuitry includes connecting terminals that protrude from the circuit board. The PCB is disposed in the camera housing and retained thereat via a fastener. The camera housing is open at a rear portion, and a sealing material is dispensed in the camera housing to seal the PCB and the connecting terminals in the camera housing. An electrical connector receives the connecting terminals and is disposed at an outer portion of the sealing material at the rear of the camera housing. The sealing material includes a thermally conductive resin and is dispensed in the camera housing in an uncured state. The sealing material, when cured, attaches the electrical connector at the rear portion of the camera.

20 Claims, 3 Drawing Sheets

(56) References Cited

U.S. PATENT DOCUMENTS

| | | |
|---|---|---|
| 2009/0244361 A1 | 10/2009 | Gebauer et al. |
| 2012/0019940 A1* | 1/2012 | Lu .................. G02B 7/025 |
| | | 359/819 |
| 2013/0242099 A1 | 9/2013 | Sauer et al. |
| 2014/0160284 A1* | 6/2014 | Achenbach .......... H04N 5/2251 |
| | | 348/143 |
| 2014/0373345 A1 | 12/2014 | Steigerwald |
| 2015/0029337 A1 | 1/2015 | Uchiyama et al. |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0048463 A1 | 2/2017 | Mleczko |
| 2017/0126938 A1 | 5/2017 | Newiger |
| 2017/0133811 A1 | 5/2017 | Conger et al. |
| 2017/0174131 A1* | 6/2017 | Sigle ................ H04N 7/181 |
| 2017/0295306 A1* | 10/2017 | Mleczko ............ B29C 45/1615 |
| 2017/0302829 A1 | 10/2017 | Mleczko et al. |
| 2017/0310863 A1* | 10/2017 | Wohlte ................ B60R 11/04 |
| 2018/0013935 A1 | 1/2018 | Kunze et al. |
| 2018/0072239 A1 | 3/2018 | Wienecke et al. |
| 2018/0147999 A1* | 5/2018 | Zurowski ............. B60R 11/04 |
| 2018/0309912 A1* | 10/2018 | Park .................... H04N 5/2252 |
| 2019/0135195 A1* | 5/2019 | Nakamura ............. B60R 11/04 |

* cited by examiner

VEHICLE CAMERA WITH CAST RESIN SEALING

CROSS REFERENCE TO RELATED APPLICATION

The present application claims the filing benefits of U.S. provisional application Ser. No. 62/508,574, filed May 19, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a driving assistance system or vision system or imaging system for a vehicle that captures image data representative of images exterior of the vehicle. The camera includes a camera housing portion and at least one printed circuit board having circuitry (including an imager at one side and connecting terminals protruding from the other side) disposed thereat. The at least one printed circuit board is disposed in the camera housing and retained thereat via a pin or fastener. A lens assembly is disposed at a lens holder of the camera housing portion and is optically aligned with the imager. The camera housing portion is open at a rear portion (which may be facing upward when the camera is fixture for assembly and sealing), and a sealing compound is dispensed in the camera housing portion to seal the printed circuit board and circuitry and the connecting terminals in the camera housing portion. A connecting portion receives the connecting terminals therein and is attached at an outer portion of the sealing compound at the rear of the camera housing portion. The connecting portion is configured to connect to a wire harness of the vehicle when the camera is disposed at the vehicle. The sealing compound comprises a thermally conductive resin and is dispensed in the camera housing portion in an uncured state, such as an uncured fluid or liquid or deformable state. The sealing compound conforms to the at least one printed circuit board and the camera housing portion via gravity.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
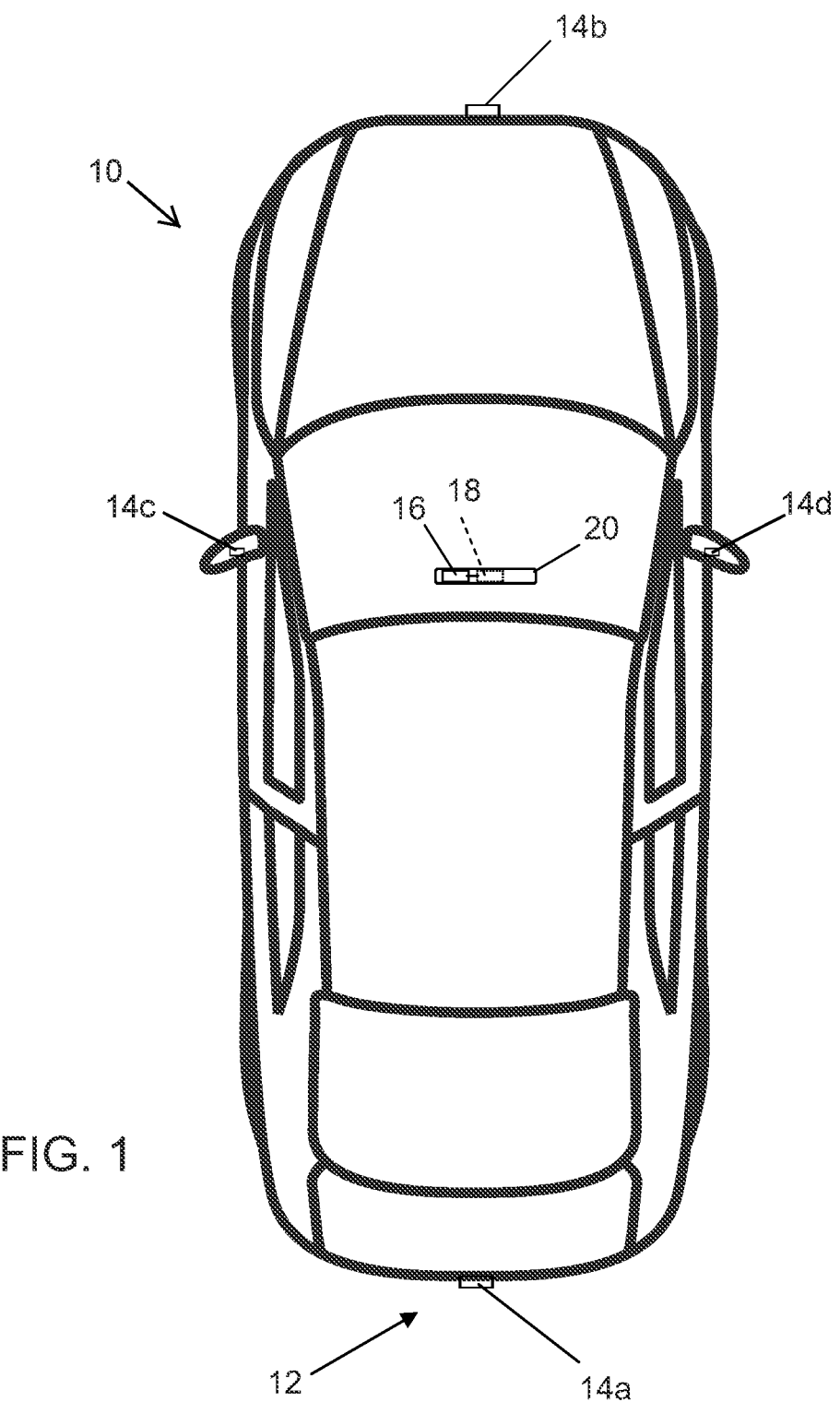
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
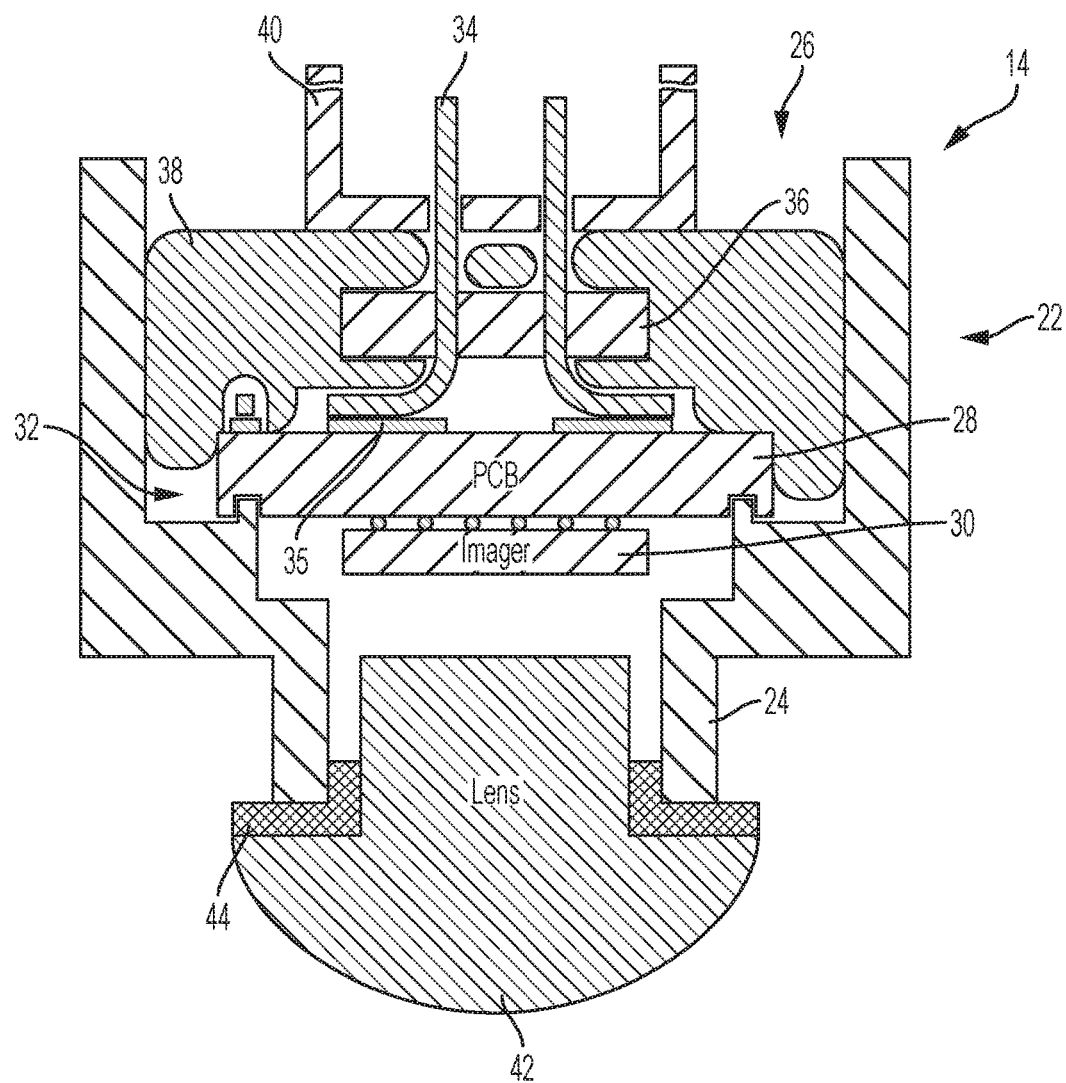
FIG. 2 is a sectional view of a camera having a sealing compound in accordance with the present invention.

In order to reduce costs, the vehicle cameras rear housings may have a rear lid or cover that may closed by using a (gravity) resin sealing or gravity mold sealing (see the "Mold compound" in FIG. 2.) The camera printed circuit board or PCB (FIG. 2) may be assembled on a conventional SMD line. There the electronics components (SMD components), the imager and the rear end connector structure (SMD pin header) may be attached (pick and place plus reflow). Optionally, the camera may have multiple PCBs such as two PCBs that are interconnected by a flexible connector structure, such as a foil, or by a connector socket and counter plug structure on both PCBs.

In the illustrated embodiment, the camera 14 includes the camera housing portion 22 and lens holder 24 (that may be formed as part of the camera housing portion). The camera housing portion may comprise an injection molded plastic structure. The camera housing portion has an open rear portion or end 26 (opposite the lens holder) and is configured to receive a PCB 28 therein (having an imager 30 established thereat). As shown in FIG. 2, the PCB 28 is disposed in the camera housing portion and may engage retaining pins or fasteners 32 or the like at a forward end or surface of the housing portion, whereby the imager 30 is disposed at a recess in the camera housing portion at the lens holder. For example, the camera housing portion 22 may be molded or formed with pins or projections at the forward surface of the recess or cavity that are received in recesses or apertures at the PCB. Optionally, the pins may comprise fasteners that protrude through respective passageways of the PCB, whereby a female fastener may be attached (e.g., threaded onto) the end of the fastener that protrudes through the PCB 28.

The PCB 28 has a plurality of electrical connecting elements or terminals or pins 34 (that may be electrically connected at a pattern of connecting pads 35 or the like established at the PCB and electrically connected to circuitry of the PCB) protruding from a side or surface of the PCB 28 that is opposite from the side of the PCB 28 at which the imager 30 is disposed. The connecting elements 34 may be received through an element 36 of the pin header such that distal ends of the connecting elements extend from the PCB 28 and the header element 36 (which is selected with the desired or appropriate connector pitch measures and dimensions for the selected electrical connector 40). The mold compound 38 is disposed (in its uncured state) in the camera housing portion 22 and conforms around the connecting elements 34 and header element 36 and the PCB 28 to retain and seal the camera components in the camera housing portion (although not shown in FIG. 2, the sealing component may flow below the header element at the PCB, depending on whether or not there is an opening at the header element through which the material may flow when in its dispensed liquid state). An electrical connector 40 is disposed at and receives the distal ends of the connecting elements 34 and is disposed at the mold compound 38 such that, when the compound cures to its cured state, the compound functions to retain the connector 40 at the rear of the camera. The lens 42 is disposed at the end of the lens holder 24 and is optically aligned with and focused at the imager 30 and adhesively attached at the lens holder (after optical alignment and focusing) via an adhesive 44.

Optionally, the PCBs may use a single point fixation, such as by utilizing aspects of the cameras described in U.S. Publication No. US-2017-0126938 (which is hereby incorporated herein by reference in its entirety) and optionally the PCBs may be fixated by a spring element, such as by utilizing aspects of the cameras described in U.S. Publication No. US-2018-0013935, which is hereby incorporated herein by reference in its entirety.

Optionally, the interconnection (such as between the circuitry of the two spaced apart circuit boards) may be done via conducting structures over the housing wall, such as by using any type of "molded interconnect device" (MID) structures. The camera may utilize aspects of vehicle vision cameras having Molded Interconnected Devices (MID), such as by utilizing aspects of cameras of the types described in U.S. Publication Nos. US-2018-0072239; US-2018-0013935; US-2017-0295306 and/or US-2016-0037028, which are hereby incorporated herein by reference in their entireties.

Figure 3:
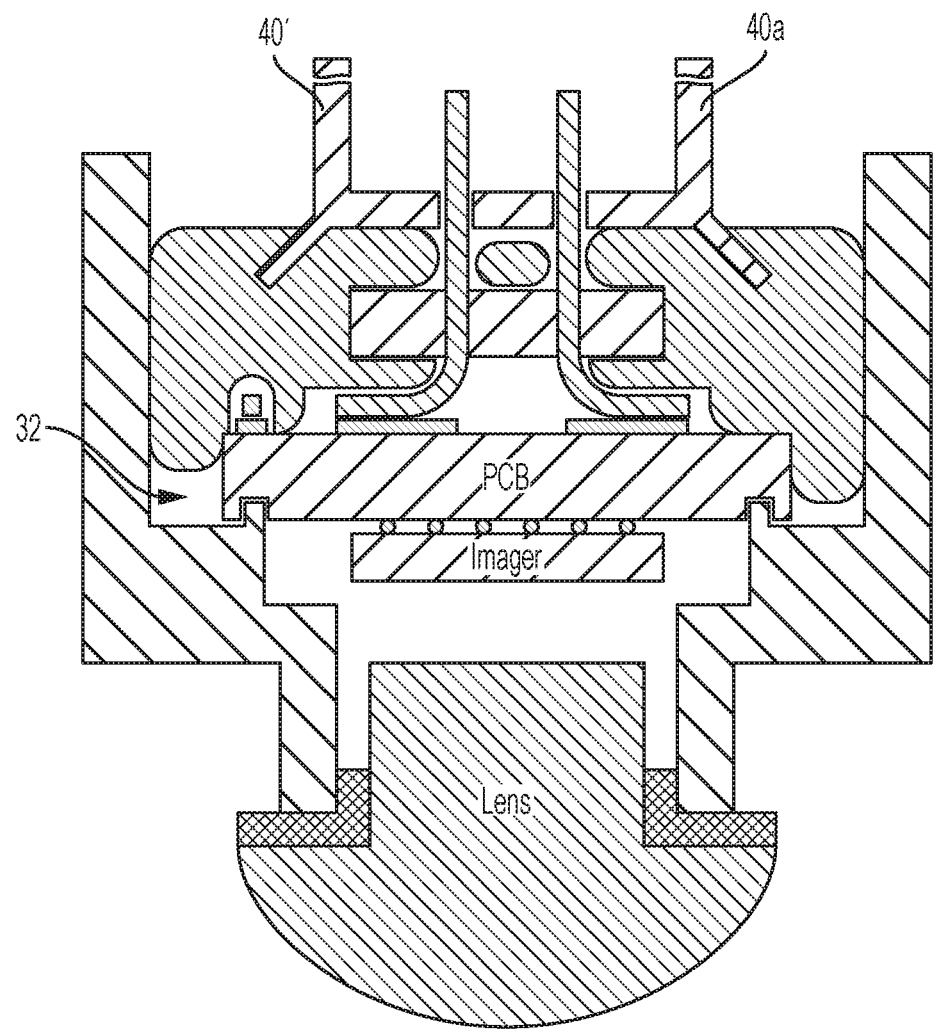
FIG. 3 is a sectional view of another camera having a sealing compound in accordance with the present invention.

One or several PCBs may include grooves or holes as resting shoulders for being aligned with the housing structure. Optionally, before or after applying the rear housing sealing compound, which may be a resin or mold, the rear end connector structure may be put onto the rear end conductors. There may be holes in the rear end connector structures (customer connector) which fit to the pin layout, for inserting the pins. By that the connector structure is floating and does not add forces to the PCB. Optionally, the connector structure may have flaps or anchor-like structures extending or protruding sideward and/or downward that get enclosed by the sealing compound, when applied afterward, such as shown in FIG. 3. As shown in FIG. 3, the anchoring elements or flaps 40a of the connector 40' protrude at an angle relative to a longitudinal axis of the camera. Thus, the sealing compound may conform around the anchoring elements and, when cured, limit longitudinal movement of the anchoring elements and connecting portion or structure relative to the camera housing portion and the sealing compound. Thus, the sealing compound may function to retain the connecting structure without fasteners or the like.

The compound thus functions to seal the camera components and to attach or retain the electrical connector at the rear of the camera. The connector may comprise any suitable connector, as may be dictated by the vehicle manufacturer or customer, whereby the appropriate connector (and corresponding or appropriate header element) may be selected from a plurality of designs and disposed at the uncured compound to complete the camera and connector assembly. Thus, a common camera housing and circuitry may be used, and a selected connector may be attached at the camera housing to provide the appropriate connector configuration for the camera application. The camera assembly and method of assembling a camera of the present invention thus provides for enhanced adaptability of a camera construction for various applications.

As a last assembly step, the lens [stack] may be aligned to the imager and glued in between the lens stack and the camera housing and may be cured by ultra violet light (UV) curing for fixation (such as by utilizing aspects of the cameras and methods described in U.S. Pat. Nos. 8,542,451 and/or 9,451,138, which are hereby incorporated herein by reference in their entireties.

For enhanced or sufficient heat dissipation, a chosen or selected or preferred sealing compound may include enhanced or superior heat conducting capabilities (such as a thermally conductive material). Optionally, the chosen compound may include enhanced EMC shielding capabilities. For example, the sealing compound may be formed out of a resin (such as, for example, a polyester resin, a polyurethane resin, an epoxy resin, a silicone resin, a venyl ester resin, a phenolic resin or an acrylic resin or the like), a foam (such as, for example, a polyether, or a polypropylene) or a plastic mold of any suitable kind.

Thus, the camera and assembly process of the present invention provides a front camera housing that receives the PCB (or PCBs) therein and retains them in position in the housing portion (such as via pins or one or more screws or the like). The PCB includes connecting pins or terminals that protrude therefrom, with the pins being configured to insert into a connector portion configured to electrically connect the camera to a vehicle wire harness or the like. A sealing compound or resin is disposed in the camera housing portion to substantially envelop the PCB and pins and header and, when cured, to hold or retain the pins relative to the camera housing. The connector portion is attached or disposed at the rear of the sealing compound or resin and receives the ends of the pins or terminals therein. The lens is optically aligned with the imager on the PCB and adhered to the lens holder to hold the lens relative to the imager after alignment. The sealing compound is preferably a thermally conductive resin or compound and is dispensed in the camera housing portion in a liquid (uncured) state so as to provide a gravity disposed resin sealing or gravity disposed mold sealing (by dispensing the uncured resin into the housing portion when the housing portion is positioned or fixtured with the lens holder pointing generally downward). The sealing compound thus provides a low cost rear cover or seal at the camera housing that provides a water-tight seal and provides thermal conductivity to draw heat from the PCB and circuitry disposed thereat during operation of the camera.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vehicular vision system, said camera comprising:

a camera housing;

a printed circuit board having circuitry disposed thereat, wherein said printed circuit board has a first side and a second side opposite said first side, and wherein said circuitry includes an imager disposed at said first side of said printed circuit board, and wherein said circuitry includes connecting terminals that protrude from said second side of said printed circuit board, and wherein said connecting terminals comprise end portions distal from said second side of said printed circuit board;

wherein said printed circuit board is disposed in said camera housing and retained thereat via a retaining element;

a lens assembly disposed at a lens holder of said camera housing, wherein said lens assembly comprises at least one lens optic optically aligned with said imager;

wherein said camera housing is open at a rear portion, and wherein a sealing material is disposed in said camera housing and seals said printed circuit board and circuitry and a portion of said connecting terminals in said camera housing;

an electrical connector configured to connect to a wire harness of the vehicle when said camera is disposed at the vehicle, wherein said electrical connector receives the end portions of said connecting terminals therein and is disposed at an outer portion of said sealing material at the rear of said camera housing;

wherein said sealing material comprises a thermally conductive resin and is dispensed in said camera housing in an uncured state and cured to a cured state to seal said printed circuit board and circuitry and the portion of said connecting terminals in said camera housing; and wherein, when said sealing material is cured to its cured state, said sealing material attaches and retains said electrical connector at the rear portion of said camera.

2. The camera of claim 1, wherein said sealing material is dispensed in said camera housing in a liquid state.

3. The camera of claim 2, wherein said sealing material conforms to said printed circuit board and said camera housing via gravity.

4. The camera of claim 1, wherein said printed circuit board comprises an imager circuit board and a connecting circuit board that are spaced apart from one another in said camera housing.

5. The camera of claim 4, wherein said first side is a side of said imager circuit board opposite said connecting circuit board, and wherein said second side is a side of said connecting circuit board opposite said imager circuit board.

6. The camera of claim 5, wherein circuitry of said imager circuit board and circuitry of said connecting circuit board are electrically connected via at least one electrically connecting element.

7. The camera of claim 6, wherein said electrically connecting element comprises a molded interconnect device formed at said camera housing.

8. The camera of claim 1, wherein said printed circuit board is attached at one or more pins that protrude from an inner surface of said camera housing.

9. The camera of claim 1, wherein said electrical connector includes at least one anchoring element that protrudes from a body portion of the electrical connector, and wherein said electrical connector is attached at said outer portion of said sealing material at the rear of said camera housing via the at least one anchoring element being inserted into said sealing material when said electrical connector is attached at an outer portion of said sealing material at the rear of said camera housing.

10. The camera of claim 9, wherein said at least one anchoring element protrudes at an angle relative to a longitudinal axis of said camera so as to limit longitudinal movement of said at least one anchoring element and said electrical connector relative to said camera housing and said sealing material when said sealing material is cured.

11. The camera of claim 1, wherein said retaining element comprises a fastener.

12. A method of assembling a camera for a vehicular vision system, said method comprising:

providing a camera housing;

providing a printed circuit board having circuitry disposed thereat, wherein the printed circuit board has a first side and a second side opposite the first side, and wherein the circuitry includes an imager disposed at the first side of the printed circuit board, and wherein the circuitry includes connecting terminals that protrude from the second side of the printed circuit board, and wherein the connecting terminals comprise end portions distal from the second side of the printed circuit board;

disposing the printed circuit board in the camera housing and retaining the printed circuit board at the camera housing;

providing a lens assembly at a lens holder of the camera housing;

dispensing a sealing material in the camera housing at an open rear portion of the camera housing, wherein the sealing material is dispensed in an uncured liquid state;

wherein the sealing material, when dispensed in the camera in its uncured liquid state, conforms to and seals at the printed circuit board and circuitry and a portion of the connecting terminals in the camera housing;

wherein the sealing material comprises a thermally conductive resin;

providing an electrical connector configured to connect to a wire harness of the vehicle when the camera is disposed at the vehicle;

disposing the electrical connector at an outer portion of the sealing material, whereby the electrical connector receives the end portions of the connecting terminals therein and contacts the outer portion of the sealing material at the rear of the camera housing;

curing the sealing material to a cured state to seal the printed circuit board and circuitry and the portion of the connecting terminals in the camera housing; and wherein, when the sealing material is cured to its cured state, the sealing material attaches and retains the electrical connector at the open rear portion of the camera.

13. The method of claim 12, wherein the sealing material conforms to the printed circuit board and the camera housing via gravity.

14. The method of claim 12, wherein the electrical connector includes at least one anchoring element that protrudes from a body portion of the electrical connector, and wherein disposing the electrical connector at the outer portion of the sealing material comprises inserting the at least one anchoring element into the sealing material.

15. The method of claim 14, wherein the at least one anchoring element protrudes at an angle relative to a longitudinal axis of the camera so that the at least one anchoring element limits longitudinal movement of the anchoring element and the electrical connector relative to the camera housing and the sealing material when the sealing material is cured.

16. The method of claim 15, wherein the at least one anchoring element comprises two anchoring elements that protrude at opposite angles relative to the longitudinal axis of the camera.

17. A camera for a vehicular vision system, said camera comprising:

a camera housing;

a printed circuit board having circuitry disposed thereat, wherein said printed circuit board has a first side and a second side opposite said first side, and wherein said circuitry includes an imager disposed at said first side of said printed circuit board, and wherein said circuitry includes connecting terminals that protrude from said second side of said printed circuit board, and wherein said connecting terminals comprise end portions distal from said second side of said printed circuit board;

wherein said printed circuit board is disposed in said camera housing and retained thereat via a retaining element;

a lens assembly disposed at a lens holder of said camera housing, wherein said lens assembly comprises at least one lens optic optically aligned with said imager;

wherein said camera housing is open at a rear portion, and wherein a sealing material is disposed in said camera housing and seals said printed circuit board and circuitry and a portion of said connecting terminals in said camera housing;

an electrical connector configured to connect to a wire harness of the vehicle when said camera is disposed at the vehicle, wherein said electrical connector receives the end portions of said connecting terminals therein and is disposed at an outer portion of said sealing material at the rear of said camera housing;

wherein said electrical connector includes at least one anchoring element that protrudes from a body portion of the electrical connector;

wherein said at least one anchoring element of said electrical connector is disposed within said sealing material and said body portion of said electrical connector is exterior the sealing material when said electrical connector is disposed at said outer portion of said sealing material;

wherein said sealing material comprises a thermally conductive resin and is dispensed in said camera housing in an uncured state and cured to a cured state to seal said printed circuit board and circuitry and the portion of said connecting terminals in said camera housing; and wherein, when said sealing material is cured to its cured state, said sealing material secures said at least one anchoring element in said sealing material and attaches and retains said electrical connector at the rear portion of said camera.

18. The camera of claim 17, wherein said sealing material is dispensed in said camera housing in a liquid state, and wherein said sealing material conforms to said printed circuit board and said camera housing via gravity.

19. The camera of claim 17, wherein said at least one anchoring element protrudes at an angle relative to a longitudinal axis of said camera so as to limit longitudinal movement of said at least one anchoring element and said electrical connector relative to said camera housing and said sealing material when said sealing material is cured.

20. The camera of claim 19, wherein the at least one anchoring element comprises two anchoring elements that protrude at opposite angles relative to the longitudinal axis of the camera.

\* \* \* \* \*